United States Patent Office 3,551,344
Patented Dec. 29, 1970

1

3,551,344
PHOTOCHROMIC PLASTIC AND METHOD
OF MAKING
Zachariah G. Gardlund, Utica, and Clifford C. Duff, Warren, Mich., assignors to General Motors Corporation, Detroit, Mich., a corporation of Delaware
No Drawing. Filed Mar. 20, 1967, Ser. No. 624,201
Int. Cl. G02b 1/04
U.S. Cl. 252—300                                   3 Claims

ABSTRACT OF THE DISCLOSURE

A photochromic plastic article may be prepared from vinyl-type resins and photochromic organic compounds by dissolving the vinyl resin together with up to about 5% by weight of the resin of a small amount of a photochromic material such as a polyaromatic organic compound having a plurality of fused benzene rings, in a suitable solvent, freezing the resulting solution, vaporizing all of the solvent from the frozen mass under conditions such that no melting occurs at any time within the residue, and then molding the residual photochrome-containing vinyl powder under suitable temperatures and pressures to obtain a plastic which reversibly changes its color at room temperature when exposed to sunlight.

---

This invention relates to photochromic plastic articles and more particularly to a method of compression molding photochrome-containing vinyl-type resins into an optically clear article which will uniformly and reversibly change color when subjected to sunlight.

For many years it has been observed that certain solid organic and inorganic materials alter their color when subjected to ultraviolet and visible light, the effect being reversed when the radiation source is removed. This phenomenon is termed photochromism and materials which display this effect are described as photochromes or as being photochromic. It has also been observed that many organic compounds exhibit photochromism under certain preferred conditions when incorporated into frozen solutions at low temperatures (for example liquid nitrogen temperatures, 77° K.). Photochromic materials may not be particularly useful when in the pure solid state or in a frozen solution. However, it has been found that some photochromic materials will display their activity in a plastic matrix at substantially room temperature if the plastic is suitably cross linked so as to be sufficiently rigid at the molecular scale. This matrix rigidity is apparently necessary to prevent or reduce collisions that remove energy from the photochrome molecules. This cross linking is an expensive step in the preparation of such plastic materials. It requires special cross linking agents not present in commercially available plastics of the vinyl-type, such as poly(methyl methacrylate).

Accordingly, it is an object of this invention to provide a method of utilizing relatively inexpensive commercially available vinyl-type resins and photochromic organic compounds to produce a plastic article which displays photochromic activity at about normal room temperature.

It is a more specific object of this invention to provide a method of incorporating photochromic organic compounds in vinyl-type polymeric resin materials by compression molding whereby the molded article is transparent and colorless or only slightly colored before irradiation by ultraviolet light and then changes to a deeper and different color in the presence of sunlight.

It is another object of the invention to provide a compression molded, photochrome-containing vinyl plastic article.

2

These and other objects are accomplished in accordance with the subject invention by first dissolving a polymeric vinyl resin together with a small but effective amount of a photochromic organic compound, usually less than 5% by weight, in a suitable solvent. After a complete solution has been obtained in which the photochrome is uniformly and thoroughly dispersed in the polymer, the solution is frozen. The frozen mixture is subjected to a relatively low temperature and low pressure environment suitable to vaporize the solvent molecules without causing any melting within solid solute residue. All of the solvent is removed in this manner to leave a residue of photochrome-containing, vinyl polymer resin. Because the photochrome and vinyl resin were initially mixed in a liquid solution, a uniform solid solution or colloidal dispersion of photochrome in the polymer is obtained after vaporization of the solvent. This polymeric solid solution is used to mold a homogeneous, optically clear article. Molding may readily be accomplished because the residue is in powder form or in a sponge form which is reduced to powder. The powder is compressed in a suitable mold under pressures and temperatures sufficient to compression mold the plastic into a predetermined article such as a disk, sheet, or the like. The resulting article is transparent and appears colorless or slightly colored in artificial visible light but changes to a deeper and different color when subjected to ultraviolet and visible radiation such as is found in sunlight or other suitable artificial source. Articles of this type may be employed in toys, computer storage systems, window panels and the like wherein a reversible, light responsive color change is desired.

Potentially any photochromic material is a candidate for use in the process of this invention. There are, of course, certain obvious limitations which may exclude some photochromes. The photochrome must be compatible with the vinyl resin in solution. It must withstand the freezing and solvent vaporization steps. It must also be stable under the compression molding operation. Moreover, it must be capable of undergoing the electronic or molecular interaction which is the basis of the photochromic phenomenon in the vinyl plastic matrix.

Photochromic materials which are preferred for use in the invention are organic polyaromatic compounds containing a plurality of fused benzene rings. Such compounds have electron systems which give rise to particular electronic properties. When these compounds are irradiated with light many of the molecules are raised from the ground state to a higher energy state, which is termed an upper singlet state. This particular high energy state is unstable and the molecules may quickly return to their stable color state or ground state by a loss of energy through collision with another molecule. Loss of energy from the excited singlet state may also occur through radiation observed as fluorescence. Alternatively, the high energy molecule in the upper singlet state may undergo a radiationless transition to a different state of lower energy, termed the lowest triplet state. This intermediate state is metastable and under favorable conditions can exhibit a long lifetime, often in the order of seconds (almost always in the range from $10^{-4}$ to $10^{+2}$ seconds). A molecule in the metastable lowest triplet state can readily lose its energy through collision and radiation (phosphorescence) and return to the ground state. However, the metastable triplet state molecule can also make a transition to a still higher triplet state. The differences in energy between the lowest triplet state and the higher triplet state is usually so small that the molecule may reach the higher state by the absorption of low energy, long wavelength light which is visible to the human eye. Since the frequency of the light which is absorbed in undergoing this transition is usually different from the normal color of the compound, the compound changes color and a photochromic affect is exhibited. Organic compounds having electron systems which tend to stabilize for short periods of time in the triplet energy state are sometimes called triplet compounds. A good example of triplet organic compounds are the polyaromatics defined above. It will be recognized that materials which display photochromic activity due to electronic interaction such as just described, are preferred for use in plastic matrix because they typically will undergo a color transition in response to sunlight an unlimited number of times without a fatigue or decomposition of the photochrome molecule.

Suitable materials for employment in accordance with this invention include chrysene, coronene, 1,2,5,6-dibenzanthracene, 2,3,6,7 - dibenzanthracene, 1,2,3,4 - dibenzanthracene, 1,2,4,5 - dibenzopyrene, 1,2,3,4 - dibenzopyrene, 3,4,9,10-dibenzopyrene, 3,4,8,9 - dibenzopyrene, anthanthrene, 1,12-benzoperylene, 1,2,4,5,8,9-tribenzopyrene 12-benzo(naphtho-2',3',4,5)pyrene. It is also observed that suitable benzospirans, a large class of organic compounds known to have photochromic activity may be employed so long as they are not decomposed during compression molding of the plastic.

Synthetic polymeric resins of the vinyl type which are normally optically transparent when compression molded are preferred for use in the invention. These include by way of example, styrene-acrylonitrile copolymer, polystyrene, poly(methyl methacrylate), poly(vinyl butyral), and vinyl acetate-vinyl butyrate copolymers.

A specific example of the invention will better illustrate the intended mode of practice. Two grams of poly(vinyl butyral) and 0.080 gram of chrysene were dissolved in a solution of 20 milliliters of dioxane and 20 milliliters of benzene in a suitable round-bottomed flask. The flask was immersed in liquid nitrogen and simultaneously rotated so as to freeze the solution on the wall of the flask. When the solution had completely solidified, the flask was removed from the bath of liquid nitrogen immediately connected to a suitable vacuum source, and evacuated to an absolute pressure of 0.04 millimeters mercury. As the flask slowly warmed up in contact with ambient air, the solvent vaporized without effecting a melting of the residual mass. In this way, the solvent was completely removed leaving a homogeneous dispersion of chrysene in poly(vinyl butyral). It is not known whether a complete solution of the photochrome in the plastic was obtained or whether it was a colloidal suspension. The residual solids were in a sufficiently finely divided state so as to be molded without further comminution. The powder was compression molded into a small disk at a pressure of about 4,000 pounds p.s.i. and temperature of 280° F. The transparent disk was colorless in an artificially illuminated room but became violet in one second in sunlight or when irradiated with ultraviolet light from a commercial sun lamp. Within one second after removal of the ultraviolet light, the disk was clear and colorless. No degradation of the photochromic effect was observed even after several hundred color changes.

The specific techniques described above were employed in a laboratory wherein liquid nitrogen was readily available for the purpose of freezing the solution. Of course, if the method of this invention is to be employed on a larger scale, other freezing equipment operating at higher temperatures may be employed. The rate of freezing is not critical as in the treatment of foods or the like since no fragile tissues are involved. The freezing simply traps the photochrome in a solution or uniform dispersion throughout the plastic while the solvent is being removed. The temperature and pressure of the environment during vaporization of the solvent are controlled so that the solvent is removed without any melting of the residual plastic. The specific conditions will depend upon the solvent or solvents employed. The term "solvent" as used herein means either a single liquid compound or mixture of suitable compounds employed to dissolve both the vinyl plastic polymer and the photochrome material. Examples of suitable solvents for many vinyl

| Compound | Matrix a | Before irradiation | Color during U. V. lamp irradiation | During sun lamp irradiation |
| --- | --- | --- | --- | --- |
| 1% Chrysene | Styr-Acn | Clear, colorless | Light Blue | Violet. |
| 2% Chrysene | Styr-Acn | do | do | Do. |
| 3% Chrysene | Styr-Acn | do | do | Do. |
| 4% Chrysene | Styr-Acn | do | do | Do. |
| 5% Chrysene | Styr-Acn | Opaque | | |
| 1% Chrysene | PS | Clear, colorless | Light Blue | Do. |
| 2% Chrysene | PS | do | do | Do. |
| 4% Chrysene | PS | do | do | Do. |
| 5% Chrysene | PS | Opaque | | |
| 1% Chrysene | PMMA | Clear, colorless | Light blue | Do. |
| 2% Chrysene | PMMA | do | do | Do. |
| 3% Chrysene | PMMA | do | do | Do. |
| 4% Chrysene | PMMA | Opaque | | |
| 0.5% Chrysene | PVB | Clear, colorless | Light blue | Do. |
| 1% Chrysene | PVB | do | do | Do. |
| 2% Chrysene | PVB | do | do | Do. |
| 3% Chrysene | PVB | do | do | Do. |
| 4% Chrysene | PVB | do | do | Do. |
| 5% Chrysene | PVB | Opaque | | |
| 0.5% Chrysene | Ac-Bu | Clear, colorless | Light blue | Do. |
| 1% Chrysene | Ac-Bu | do | do | Do. |
| 2% Chrysene | Ac-Bu | Opaque | | |
| 1% 1,2,3,4-dibenzanthracene | PMMA | Clear, pale yellow | Light blue | Light blue. |
| 1% 1,2,5,6-dibenzanthracene | PMMA | do | Light viloet | Green. |
| Do | PVB | do | do | Do. |
| Do | PS | do | do | Do. |
| Do | Styr-Acn | do | do | Do. |
| 2% 1,2,5,6-dibenzanthracene | Styr-Acn | do | do | Do. |
| 0.5% 2,3,6,7-dibenzanthracene | PMMA | Green | No change | No change. |
| 1% 1,2,4,5-dibenzpyrene | PMMA | Clear, orange | Light blue | Light blue. |
| Do | PVB | Clear, light yellow | Light blue | Do. |
| Do | PMMA | Clear, yellow | Light green | Green. |
| 1% 3,4,9,10-dibenzpyrene | PMMA | Clear, orange | Blue | Blue. |
| 1% 3,4,8,9-dibenzpyrene | PMMA | do | Green | Green. |
| 1% Anthanthrene | PMMA | Clear, brown | Light blue | Light blue. |
| 1% 1,12-benaperylene | PMMA | Clear, orange | Blue | Blue. |
| 1% Coronene | PVB | Clear, light yellow | Light green | Green. |
| 0.5% 1,2-benzo(naphtho-2',3',4,5)pyrene | PVB | do | Green | Do. |
| 1% 1,2-benzo(naphtho-2',3',4,5)pyrene | PVB | do | do | Do. |
| 1% 1,2,4,5,8,9-tribenzopyrene | PVB | do | Blue | Blue. |

Note:
a = Code for matrices.
Styr-Acn = Styrene-Acrylonitrile copolymer.
PS = Polystyrene.
PMMA = Poly(methyl methacrylate).
PVB = Poly(vinyl butyral).
Ac-Bu = Acetate-butyrate copolymer.

polymer-photochrome combinations are benzene, cyclohexane, 1,4-dioxane, and mixtures thereof.

The table above summarizes the results of other experiments in which various photochromes and plastics were processed in accordance with the invention as in the above example. It will be seen that small but effective amounts of photochromes dispersed throughout the plastic here effectively achieve the desired phenomenon.

Photochromic plastic articles may be produced in accordance with the invention in any suitable shape of configuration. It is also to be realized that the articles could be employed in a laminate. For example, a film of phototropic plastic could be sandwiched between two layers of glass thereby combining the hardness and optical properties of glass with the photochromic properties of the plastic material. Thus, the subject invention provides a suitable means of employing polymerized resins which are commercially available to form a sufficient rigid matrix wherein the photochromic properties of suitable compounds may be realized.

While the invention has been described in terms of a preferred embodiment thereof, it is readily apparent that other forms may be adapted by one skilled in the art and thereby the scope of the inevntion is intended to be limited only by the following claims.

We claim:

1. A method of making a photochromic plastic article comprising the steps of dissolving transparent polymerized synthetic vinyl resin together with a small but effective amount of organic polyaromatic photochromic material in a solvent, freezing the solution produced thereby, vaporizing all of said solvent without melting the residual solid solute materials, and compression molding said solid residue under sufficient elevated temperatures and pressures to fuse the same into an optically clear plastic article displaying reversible photochromic properties when subjected to sunlight.

2. A method of making a photochromic vinyl plastic article comprising the steps of dissolving polymerized transparent synthetic vinyl resin together with a small but effective amount of a triplet state polyaromatic organic compound in a solvent to form a solution, freezing said solution, vaporizing all of said solvent under conditions of temperature and pressure whereby the residual solute remains in the solid state, and compression molding said residual solute with sufficient heat and pressure to fuse the same into an optically clear plastic article displaying reversible photochromic properties when subjected to sunlight, said triplet state compound being a condensed ring, polynuclear hydrocarbon exhibiting a triplet state effect in said vinyl resin.

3. A method of making a photochromic vinyl plastic article comprising the steps of dissolving polymerized transparent synthetic vinyl resin together with up to about 5% by weight of a triplet state polyaromatic organic compound in a solvent to form a solution, freezing said solution, vaporizing all of said solvent under conditions of temperature and pressure whereby the residual solute remains in the solid state, and compression molding said residual solute with sufficient heat and pressure to fuse same to an optically clear plastic article displaying reversible photochromic properties when subjected to sunlight, said triplet state compound being a condensed ring, polynuclear hydrocarbon exhibiting a triplet state effect in said vinyl resin.

References Cited

UNITED STATES PATENTS

| | | | |
|---|---|---|---|
| 3,214,382 | 9/1965 | Windsor | 252—301.2 |
| 2,888,346 | 5/1959 | Tulagin et al. | 252—300 |
| 2,976,259 | 3/1961 | Hardy et al. | 252—300 |
| 3,022,318 | 2/1962 | Berman et al. | 96—90PC |
| 3,160,665 | 1/1964 | Siegrist et al. | 252—300 |
| 3,291,746 | 12/1966 | Dorman et al. | 252—300 |
| 3,359,103 | 12/1967 | Becker et al. | 96—90 PC |
| 3,444,180 | 5/1969 | Maeder et al. | 252—300 |

GEORGE F. LESMES, Primary Examiner

J. P. BRAMMER, Assistant Examiner

U.S. Cl. X.R.

96—90; 161—203, 204

Notice of Adverse Decision in Interference

In Interference No. 99,074 involving Patent No. 3,551,344, Z. G. Gardlund and C. C. Duff, PHOTOCHROMIC PLASTIC AND METHOD OF MAKING, final judgment adverse to the patentees was rendered Nov. 17, 1975, as to claims 1, 2 and 3.

[*Official Gazette March 23, 1976.*]